Feb. 4, 1969          F. B. FISHBURNE ET AL          3,425,465
                        UP-PACKING TWIN PRESS
Filed Aug. 23, 1965                                Sheet 1 of 6

INVENTORS
Francis B. Fishburne &
Berkley Lee Richardson
BY J. Hanson Boyden,
ATTORNEY INVENTORS
Francis B. Fishburne &
Berkley Lee Richardson BY  J. Hanson Boyden,

ATTORNEY

INVENTORS
Francis B. Fishburne &
Berkley Lee Richardson

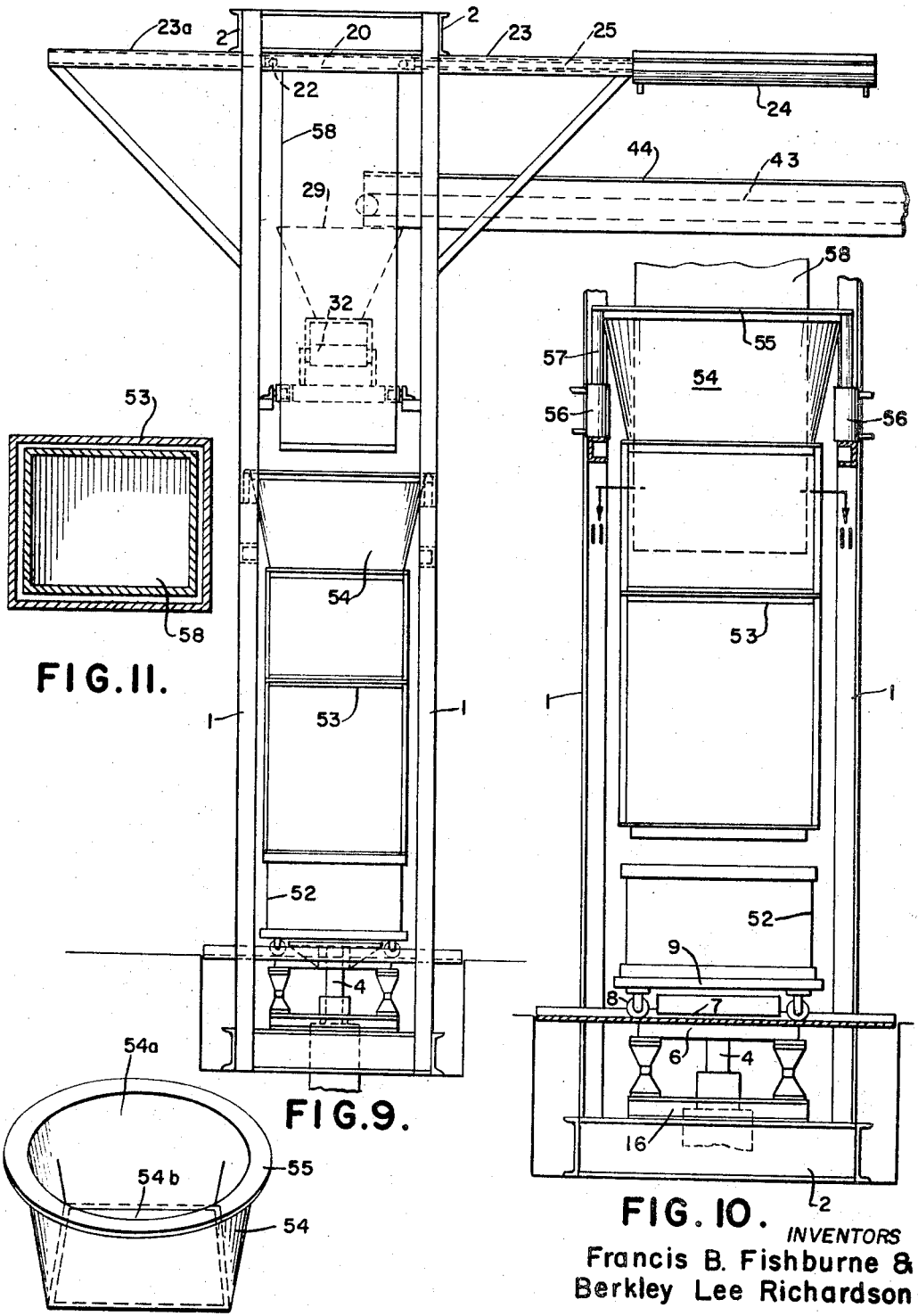

United States Patent Office 3,425,465
Patented Feb. 4, 1969

3,425,465
UN-PACKING TWIN PRESS
Francis B. Fishburne, Asheville, N.C., and Berkley Lee Richardson, Danville, Va. (both % Fishburne Equipment Company, Inc., P.O. Box 338, Arden, N.C. 28704)
Filed Aug. 23, 1965, Ser. No. 481,492
U.S. Cl. 141—80    4 Claims
Int. Cl. B65b 1/24; B30b 15/06

ABSTRACT OF THE DISCLOSURE

The press comprises a pair of vertical power cylinders below the floor of the building, and upwardly moving pistons in said cylinders, dollies supporting a pair of containers and superposed chargers, and a pair of abutment heads disposed one above each charger. These abutment heads are of a size to telescope within the chargers when moved horizontally by power means into registry with the chargers, and the chargers move upwardly.

Tobacco is loaded into the top of the chargers by means of a distributing unit comprising a hopper having an opening in its bottom, beneath which opening is disposed a reversible endless conveyor. An endless supply conveyor delivers into said hopper.

The press is also provided with means by which tobacco can be packed, when desired, in rectangular cases or boxes, instead of round containers such as hogsheads, in which case chargers of rectangular cross-section are employed.

---

This invention relates to apparatus for packing loose compressible material, such as tobacco, in containers, and more particularly to apparatus of this kind employing an up-packing power-operated plunger or ram.

In equipment of this type, it has been common practice to employ a charger above and supported on the container, and a fixed abutment head above and in registry with the charger, so that, after the container and charger are filled with material, the plunger raises the container and charger, causing the latter to telescope over the abutment head, thus compressing the material against the abutment head.

An object of the invention is to provide means for mounting the abutment head for horizontal movement, so that it may be shifted into and out of registry with the charger, whereby, when out of registry therewith, conveyor and distributor means may freely deliver material into the top of the charger.

A further object is to device means for moving the distributor means into operative position relative to said charger, so that it may deliver into the same, and out of operative position, to one side of the charger, so that the abutment head can be brought into registry therewith.

Another object of the invention is to provide improved conveyor and distributor means for use in connection with a twin press having a pair of chargers spaced apart horizontally, such means comprising a frame carrying a reversible conveyor and a pair of spaced distributor chutes in fixed relation to said conveyer and arranged to deliver into said chargers, and means for reciprocating said frame as a unit to bring said chutes alternately into and out of operative position with respect to said chargers.

A still further object of the invention is to device a press having a rotary distributor, which using the same rotary distributor, can be used for packing either cylindrical containers, such as hogsheads, or rectangular containers or cases, as desired.

With the above and other objects in view, and to improve generally on the details of such apparatus, the invention consists of the contruction and arrangement of parts hereinafter described and claimed, and illustrated in the accompanying drawings, forming part if this specification, and in which:

FIG. 9 is an elevation of the same apparatus as shown in FIG. 8, but looking in a direction at right angles to that of FIG. 8;

FIG. 10 is a side elevation on a somewhat enlarged scale, showing the lower part of the apparatus illustrated in FIG. 8;

FIG. 11 is a horizontal transverse section substantially on the line 11—11 of FIG. 10;

FIG. 12 is a perspective view of the funnel-like element shown at the top of the charger in FIGS. 8, 9 and 10.

Figure 1:
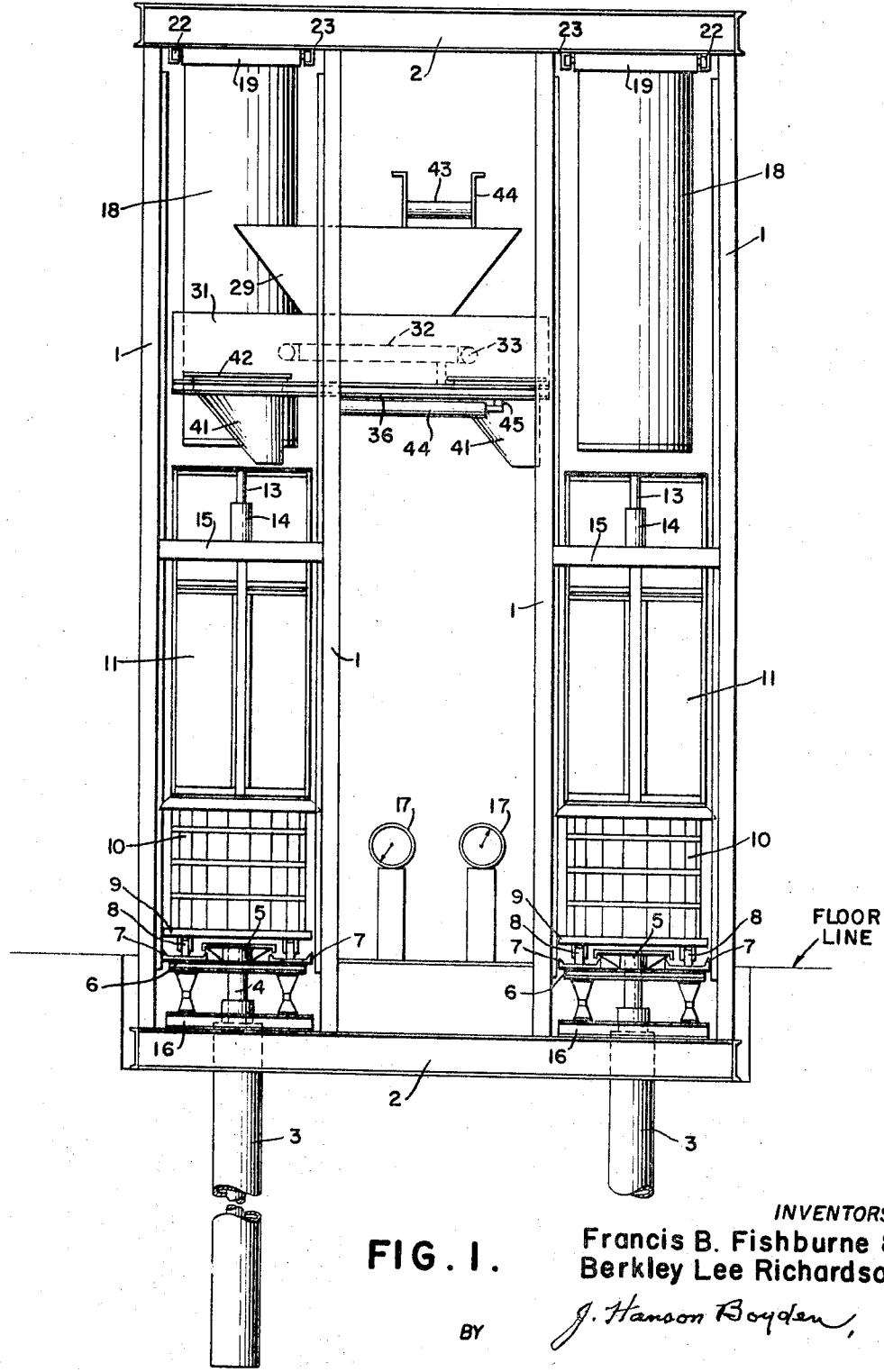
FIG. 1 is a side elevation of a twin press embodying the invention.
Figure 2:
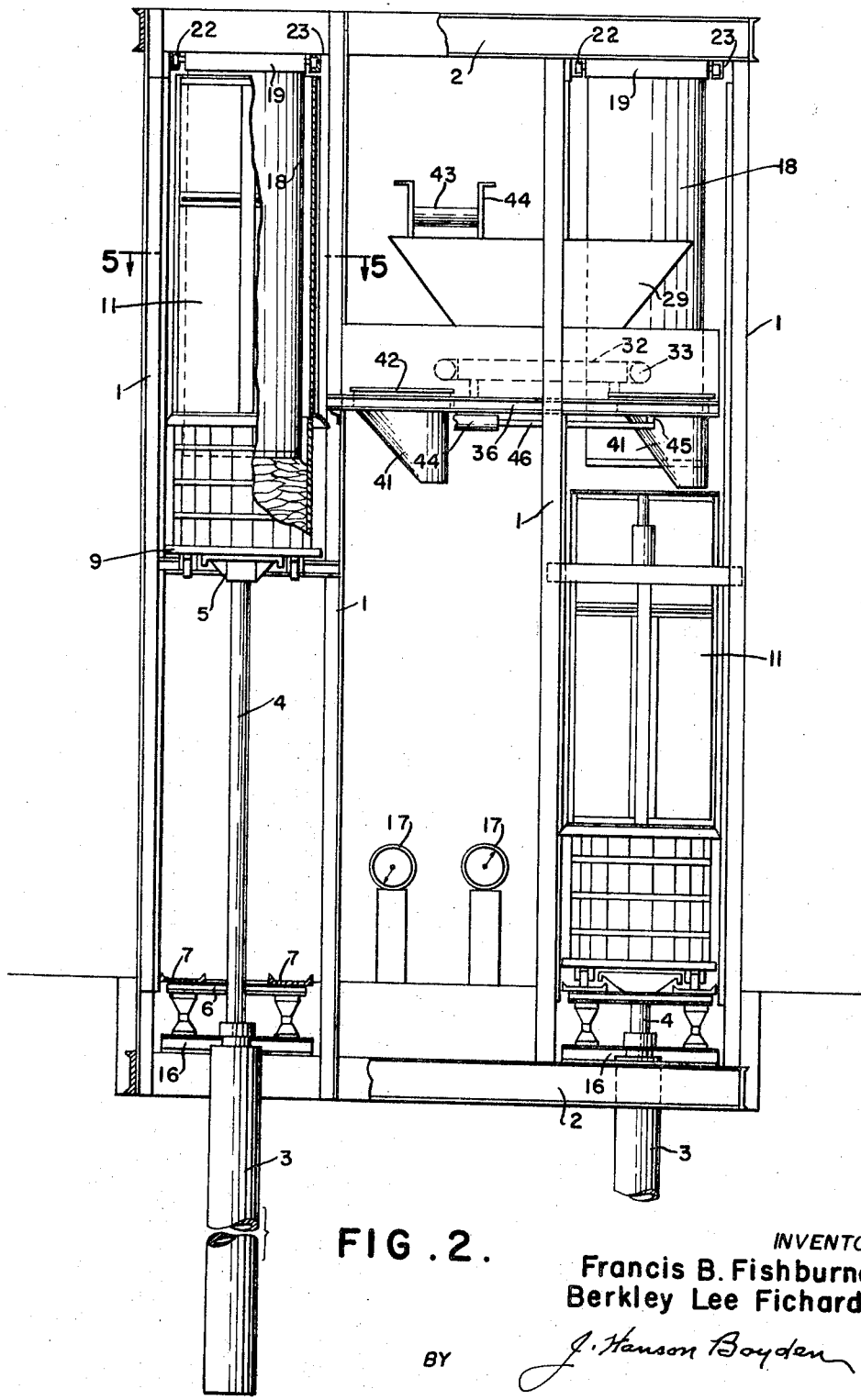
FIG. 2 is a similar view, showing the parts in a different position.

Referring to the drawings in detail, the apparatus comprises a main frame composed of upright structural members 1 such as angle irons, and cross beams 2.

Figure 3:
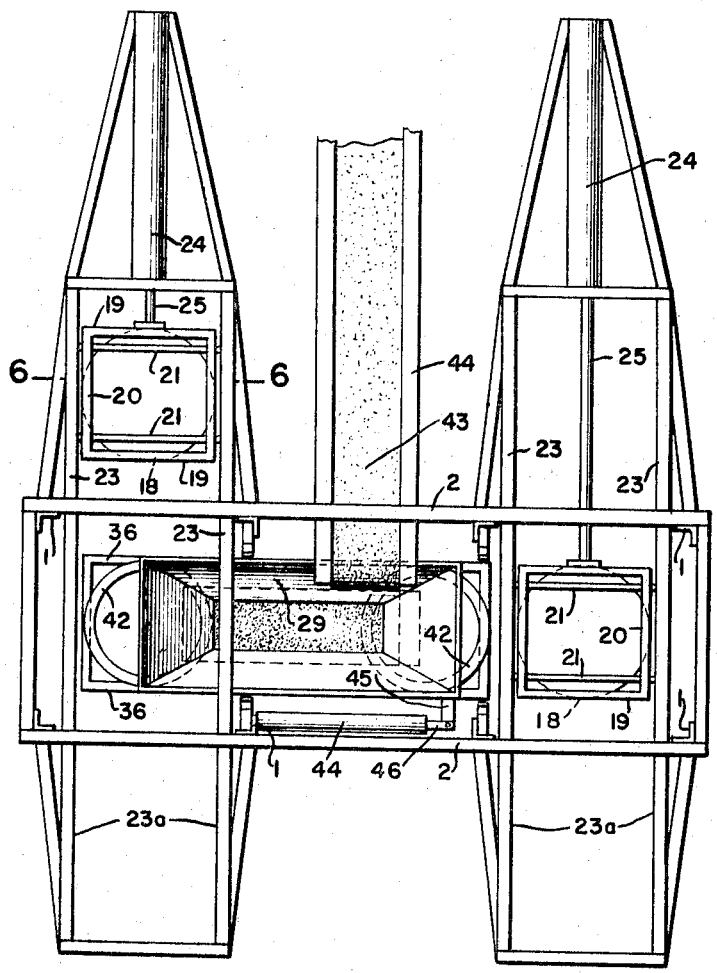
FIG. 3 is a plan view thereof.

Extending downwardly below the floor level of the building in which the installation is made are a pair of vertical power cylinders 3 having piston rods 4 carrying at their upper ends enlarged heads or plungers 5. These cylinders and plungers are spaced apart horizontally a suitable distance, and each is located at the center of a square defined by four of the uprights 1, as shown in FIGS. 3 and 5. These groups of four uprights constitute filling and pressing stations, at which the containers 10, to be filled, are positioned. As shown in FIGS. 1 to 7, these containers are cylindrical, such as hogsheads.

Supported on steel framework 6 are wheel tracks 7, normally at floor level, and the containers are carried by dollies 9, having wheels 8 adapted to roll on the tracks 7.

The framework 6 at each station is supported on a scale platform 16, operatively connected with a scale dial 17, in a manner generally similar to that illustrated in Patent No. 2,732,113 to Rice.

Figure 7:
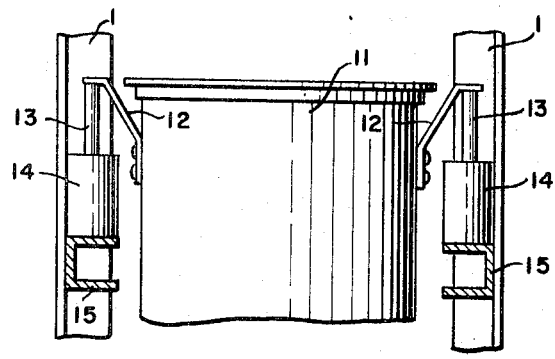
FIG. 7 is a fragmentary side elevation on a somewhat enlarged scale, showing the upper end of one of the chargers and associated parts.

Resting on each container 10 is a vertically movable cylindrical charger 11, to which are fixed at opposite sides brackets 12 (see FIG. 7). Positioned under these brackets 12 are the piston rods 13 of air cylinders 14, supported on frame members 15. The purpose of these cylinders 14 is to lift the chargers so that the containers can be placed under them. The arrangement is essentially the same as that shown in the above mentioned patent to Rice.

Associated with each charger 11 is an abutment head 18. These abutment heads are cylindrical bodies of a length at least equal to the length of the chargers, and have flat, closed, lower ends. These lower ends lie in a horizontal plane normally above the upper ends of the chargers, as shown in FIG. 1. Each of the abutment heads is attached at its upper end to a supporting frame made up of members 19 and 20 (see FIGS. 3 and 6). Adjacent the opposite ends of this frame are transverse shafts 21, having at their ends wheels 22 running in channel track members 23, which extend horizontally above and across the position of the charger. As shown in FIG. 3, these track members 23 extend substantially beyond the position of the charger, as indicated at 23a, for a purpose described later.

The supporting frames 19, 20, from which the abutment heads are suspended, are moved back and forth along the track members 23 by means of air cylinders 24, having piston rods 25 secured to the cross member 19 of the frame.

As above stated, the chargers are movable vertically, and to guide them in such movement we provide guide rails 26 (see FIG. 5) rigidly secured to two of the diagonally opposite uprights 1, and extending parallel therewith. Cooperating with each of these guide rails are a pair of flanged wheels or rollers 27, the flanges of which embrace the sides of the guide rail, which, as shown, is of square section. Each pair of wheels or rollers is mounted in a bracket 28 welded or otherwise secured to the charger.

Figure 4:
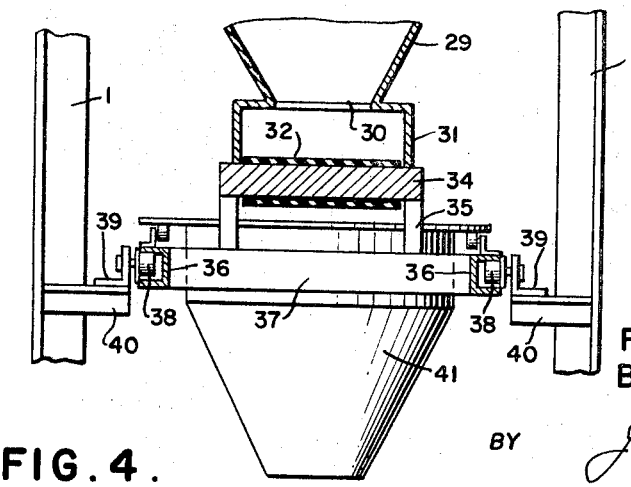
FIG. 4 is a vertical transverse section on an enlarged scale through the distributor unit.
Figure 8:
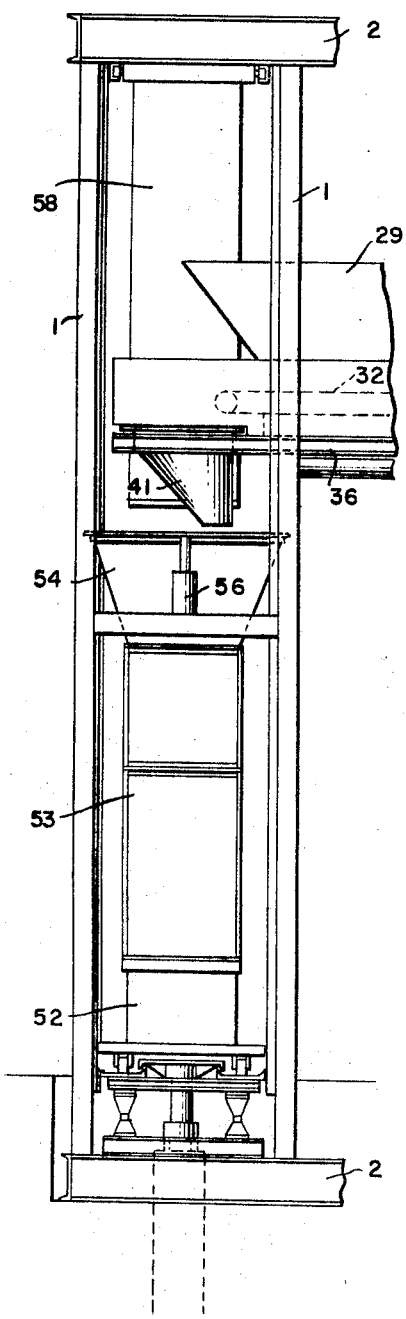
FIG. 8 is a side elevation of a slightly modified arrangement for packing rectangular cases, parts being broken away.
Figure 5:
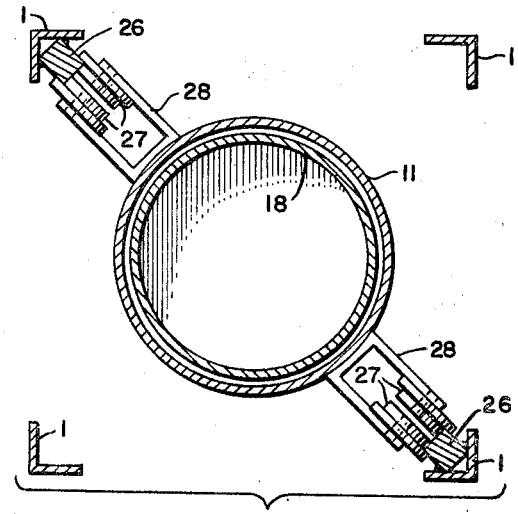
FIG. 5 is a horizontal transverse section on an enlarged scale, substantially on the line 5—5 of FIG. 2.
Figure 6:
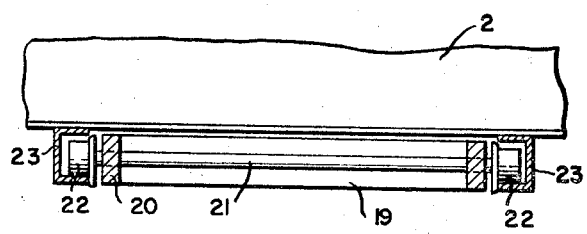
FIG. 6 is a vertical transverse section on an enlarged scale substantially on the line 6—6 of FIG. 3.
Figure 13:
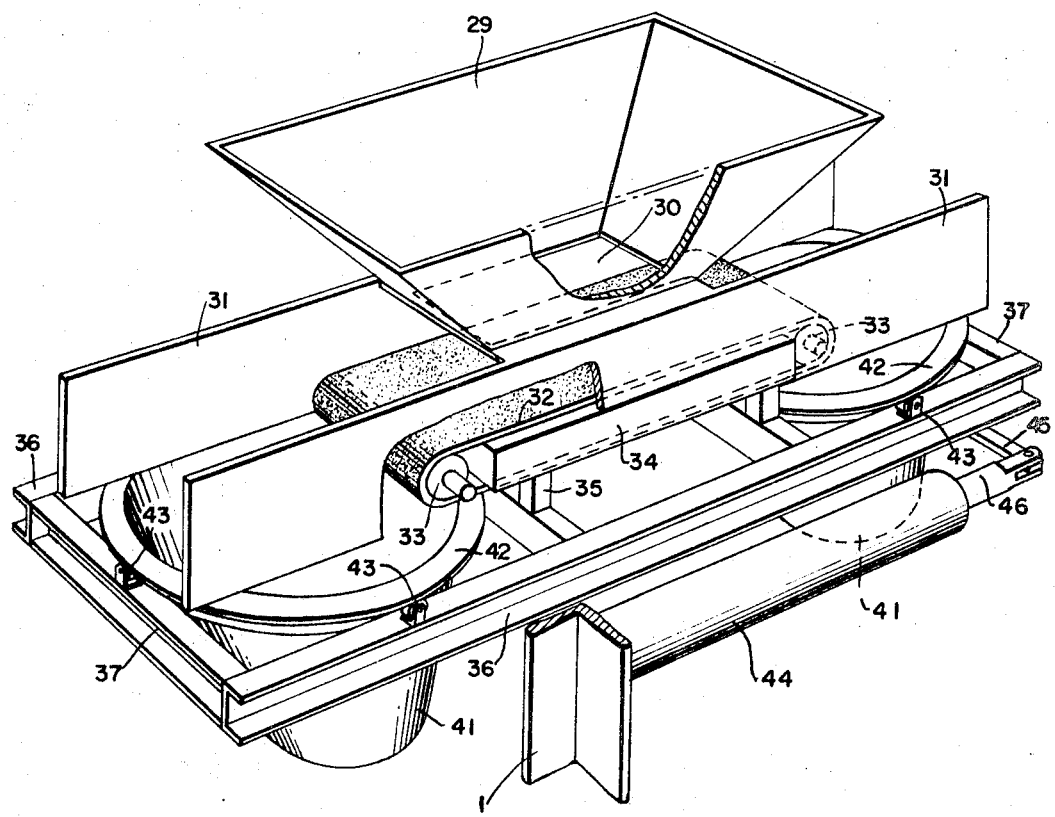
FIG. 13 is a perspective view of our improved distributor unit.

To deliver the tobacco or other material into the tops of the chargers, we employ the improved distributor unit best shown in FIGS. 4 and 13. This unit comprises an elongated hopper 29, having at its bottom a rectangular discharge opening 30. The hopper is supported on an enclosure comprising side panels 31, above an endless reversible conveyor belt 32, running around rollers 33, and straddling a floor 34, supported on spaced legs 35.

The hopper, side panels and belt are all mounted on a rectangular frame made up of side members 36 and end members 37. Two parallel series of stationary rollers 38, each series being in alignment, are supported on brackets 39 mounted on horizontal members 40, welded or otherwise secured to the uprights 1. The two series of fixed rollers are spaced apart a distance equal to the width of the frame 36, 37, so that the side members 36 of the frame, which are channel shaped, fit over and travel along these rollers. By reference to FIG. 3, it will be noted that the side members 36 and the direction of travel of the frame are at right angles to the direction of movement of the abutment heads 18.

Also carried by the frame 36, 37, one near each end, are a pair of rotary distributor chutes 41. Each of these chutes may have at its upper edge a horizontal flange 42, supported on rollers, mounted on the frame members 36, 37, and rotated by means of a motor and belt (not shown), in a manner similar to that shown in Patent No. 2,690,827, to Wiggins.

In order to move the distributor unit back and forth over the rollers 38, we employ an air cylinder 44, supported on one of the uprights 1, and having a piston rod 46 connected with one of the side members 36 by means of a suitable bracket 45.

An endless supply conveyor 43, supported on a suitable frame 44, feeds a continuous stream of material onto the reversible packer conveyor 32, as in prior Fishburne patents, Nos. 2,675,154 and 3,188,941. In the present case, however, this supply conveyor delivers the material into the hopper 29, from which it passes through the bottom opening 30 to the reversible belt 32. It will be understood that the hopper is at least as long as the distance through which the distributor unit travels, so that whether the unit is in the position shown in FIG. 1 or the position shown in FIG. 2, the end of the supply conveyor always overlies the hopper.

In FIGS. 8 to 12, inclusive, we have illustrated apparatus capable of packing material in rectangular cases, instead of hogsheads. In these figures, the rectangular case is illustrated at 52. The apparatus differs from that shown in the previous figures, only in two respects, namely (1) the charger 53 and abutment head 58 are of a cross-sectional shape to match that of the rectangular container, as shown in FIG. 11; and (2) at the top of the charger is placed a funnel-like member 54. This member has a circular upper end 54a to accommodate the rotary distributor chute 41, and a rectangular bottom 54b to fit the upper end of the rectangular charger, as clearly shown in FIG. 12. The member is rigidly secured to the top of the charger.

The member 54 also has at its upper edge a horizontal flange 55, under which the piston rods 57 of air cylinders 56 engage to lift the charger so that the containers 52 may be inserted or removed from under it. In FIG. 10 the charger is shown as thus lifted.

It will thus be seen that the same distributor unit as illustrated in FIG. 13 may be employed to pack either hogsheads or rectangular cases, as desired, simply by using a charger and abutment head of a different shape.

In the operation of either form of apparatus the distributor unit is first shifted into position to deliver into one of the chargers, if a twin press is being used. When a sufficient amount of material has been fed into the charger, the distributor unit is shifted away from this charger and the belt 32 reversed, so as to deliver into the other charger. The amount of material delivered is indicated by the scale dial 17. The operator then manipulates the valve controlling the supply of air to the cylinder 24 in such a way as to cause the piston of this cylinder to move the abutment head 18 into a position such as shown at the right of FIG. 3, in which position it registers with the charger. The operator thereupon admits motive fluid to the bottom of cylinder 3, thus causing the plunger 5 to raise the dolly 9, container, and charger, the container telescoping up over the abutment head, compressing the material against it. The container and charger are then lowered, the charger lifted by the air cylinders, and the dolly and filled container removed.

The valves controlling the admission of air or hydraulic fluid to the respective cylinders may be directly operated manually, or electrically actuated, and controlled by suitable switches, or the above sequence of operations may be initiated by electric contacts on the scale dial itself, as covered by Fishburne Patent No. 3,118,512. It is desirable, however, to provide either a mechanical or electrical interlock to make it impossible for the abutment head to be shifted into registry with the charger, or the charger raised, while the distributor unit is in operative position over the charger. A mechanical interlock of this nature is disclosed in the above mentioned Fishburne Patent No. 2,675,154.

What we claim is:

1. Apparatus for filling containers with loose, compressible material comprising an up-packing power operated plunger, a container and charger supported on said plunger, a vertically disposed abutment head mounted with its lower end normally in a plane above the level of the top of said charger, a distributor for the material being packed, said distributor being movable into and out of position to deliver material into the upper end of said charger, means for supporting said abutment head for horizontal movement into and out of registry with said charger, means for moving said distributor out of delivering position and shifting said abutment head into registry with said charger, said charger being of a size to snugly telescope over said abutment head, and means for causing said plunger to raise the container and charger so as to compress the material beneath the abutment head.

2. Apparatus for filling containers with loose, compressible material comprising an up-packing power operated plunger, a container and charger supported on said plunger, a vertically disposed abutment head, said charger being of such size as to telescope snugly over said abutment head, a distributor for delivering material into said charger, both said distributor and the lower end of said abutment head being normally positioned above the level of the top of said charger, both said distributor and abutment head being mounted for horizontal movement, means for moving said distributor to an operative position over said charger, means for moving said distributor to an inoperative position to one side of said charger after the desired amount of material has been delivered, means for thereupon shifting said abutment head to a position in registry with said charger, and means for causing said plunger to raise said container and charger to compress the material against the abutment head.

3. Apparatus for filling containers with loose, compressible material comprising an up-packing power operated plunger, a container and charger supported on said plunger, a vertically disposed abutment head, said charger being of such size as to telescope snugly over said abutment head, a distributor for delivering material into said charger, both said distributor and the lower end of said abutment head being normally positioned above the level of the top of said charger, both said distributor and abutment head being mounted for horizontal movement, means for shifting said distributor and abutment head alternately, along paths lying at an angle to each other, into and out of a position immediately over said charger, whereby said distributor may first deliver the desired amount of material into said charger and then said plunger may raise said container and charger to compress the material against said aubtment head.

4. Apparatus for filling containers with loose compressible material comprising means defining a pair of horizontally spaced filling and pressing stations, at which stations the open top containers to be filled are positioned, a charger immediately above the open top of each container, said charges being mounted for vertical movement, an elongated vertically extending abutment head of substantially the length of the charger and of a size snugly fitting within the charger, means supporting said abutments at their upper ends, with their lower ends normally above the level of said chargers, means for selectively moving said abutment heads horizontally into and out of registry with said chargers, a pair of ventrically operating press plungers mounted below said containers at said filling and pressing stations, means for filling said containers and chargers with material to be packed, and means whereby said plungers can raise each of said containers, together with its associated charger, when an abutment head is in registry with the charger, in such manner as to cause the said charger to telescope over the abutment and thus compress the material in the charger and container.

References Cited

UNITED STATES PATENTS

| | | | |
|---|---|---|---|
| 342,805 | 6/1886 | Meyer. | |
| 2,499,310 | 2/1950 | Hathaway et al. | 100—229 X |
| 2,675,154 | 4/1954 | Fishburne | 141—73 X |

LAVERNE D. GEIGER, *Primary Examiner.*

E. J. EARLS, *Assistant Examiner.*

U.S. Cl. X.R.

100—229; 141—232